(12) United States Patent
Shimizu et al.

(10) Patent No.: US 10,508,713 B2
(45) Date of Patent: Dec. 17, 2019

(54) CORD LOCK

(71) Applicant: NIFCO INC., Yokosuka-shi, Kanagawa (JP)

(72) Inventors: Yohei Shimizu, Yokosuka (JP); Gaku Kawaguchi, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 16/123,497

(22) Filed: Sep. 6, 2018

(65) Prior Publication Data

US 2019/0078646 A1    Mar. 14, 2019

(30) Foreign Application Priority Data

Sep. 11, 2017    (JP) ................................. 2017-173696

(51) Int. Cl.
*F16G 11/10*    (2006.01)

(52) U.S. Cl.
CPC .......... *F16G 11/103* (2013.01); *F16G 11/101* (2013.01)

(58) Field of Classification Search
CPC .... F16G 11/103; F16G 11/101; F16G 11/106; F16G 11/044; Y10T 24/3969; Y10T 24/3713; Y10T 24/3984; Y10T 24/3996
See application file for complete search history.

(56) References Cited

U.S. PATENT DOCUMENTS

| | | | | |
|---|---|---|---|---|
| 307,806 A | * | 11/1884 | Sailer | ...................... F16G 11/04 24/136 R |
| 2,200,895 A | * | 5/1940 | Rio | .......................... A43C 7/00 24/136 R |
| 3,007,220 A | * | 11/1961 | Hafner | ................... B65D 63/14 403/18 |
| 4,156,574 A | * | 5/1979 | Boden | ................... F16G 11/106 24/115 M |

(Continued)

FOREIGN PATENT DOCUMENTS

| | | |
|---|---|---|
| EP | 2607747 A2 | 6/2013 |
| FR | 2792506 A1 | 10/2000 |
| JP | 2005-000231 A | 1/2005 |

OTHER PUBLICATIONS

Europe Patent Office, "Search Report for European Patent Application No. 18193415.9," dated Feb. 13, 2019.

*Primary Examiner* — Robert Sandy
*Assistant Examiner* — Rowland Do
(74) *Attorney, Agent, or Firm* — Manabu Kanesaka

(57) ABSTRACT

A cord lock includes a female member having a first opening, a second opening, an insertion path for a string therebetween, and female-side fastening portions formed in the insertion path, a male member having one portion entering into the insertion path from a side of the first opening, and male-side fastening portions at the one portion adapted to be fastened to the string inserted to pass through the insertion path in cooperation with the female-side fastening portions, and a spring member interposed between (Continued)

the female member and the male member. The fastening relative to the string is released by a pulling operation of reducing an entering amount of the one portion of the male member into the insertion path. A first contact portion of the spring member is integrally formed with the female member, and a second contact portion of the spring member is integrally formed with the male member.

3 Claims, 14 Drawing Sheets

(56) References Cited

U.S. PATENT DOCUMENTS

| | | | | | |
|---|---|---|---|---|---|
| 4,878,269 | A | * | 11/1989 | Anscher | F16G 11/101 24/115 G |
| 5,572,770 | A | * | 11/1996 | Boden | F16G 11/101 24/136 R |
| 5,894,639 | A | * | 4/1999 | Boden | F16G 11/106 24/115 G |
| 6,457,214 | B1 | * | 10/2002 | Boden | F16G 11/101 24/115 M |
| 9,797,421 | B2 | * | 10/2017 | Gaudillere | F16B 2/06 |

* cited by examiner

CORD LOCK

BACKGROUND OF THE INVENTION AND RELATED ART STATEMENT

The present invention relates to an improvement of a cord lock.

There is a string fixture including a case through which a string is inserted, and a lock member provided with an engagement edge operating an engagement force to the string in cooperation with an engagement wall face of the case (see Patent Document 1).

In the Patent Document 1, a compression spring is interposed between the case and the lock member. The case and the lock member are combined such that from a state wherein one end of the spring abuts against a lock member side, a spring receiving member abutting against the other end of the spring is assembled to a case side. By the spring, the lock member is urged in a direction where the engagement edge comes close to the engagement wall face, and operates the engagement force to the string.

PATENT DOCUMENT 1

Japanese Patent Application Publication No. 2005-231

SUMMARY OF THE INVENTION

Problems to be Solved by the Invention

In the Patent Document 1, in order to form this type of string fixture (cord lock), it is necessary to have a minimum of four parts of the case, the lock member, the spring, and the spring receiving member. Also, in an assembly thereof, the spring receiving member which abuts against the other end of the spring is required to be assembled to the case while interposing the spring between the case and the lock member.

A main object of the present invention is to minimize the number of structural parts of this type of cord lock without damaging functionality of the cord lock.

Further objects and advantages of the invention will be apparent from the following description of the invention.

Means to Solve the Invention

In order to obtain the aforementioned object, in the present invention, a cord lock comprises a female member provided with a first opening, a second opening, and an insertion path for a string ranging therebetween; and a male member entering one portion thereof into the insertion path from the first opening side; and a spring member between the female member and the male member. The male member includes a male-side fastening portion to be fastened to the string inserted to pass through the insertion path in cooperation with a female-side fastening portion formed inside the insertion path at the aforementioned one portion. Also, the cord lock is formed such that fastening relative to the string is released by a pulling operation of reducing an entering amount of one portion of the male member into the insertion path. Also, a first contact portion of one spring end of the spring member is integrally formed with the female member, and a second contact portion of the other spring end of the spring member is integrally formed with the male member.

In one aspect of the present invention, the male member comprises a main member portion provided with the second contact portion on a side opposite to a side where the male-side fastening portion is formed, and the female member comprises a pair of leg portions extending from the first opening and forming a housing space for the main member portion between the leg portions. Also, at an extending end side of each leg portion, there is formed a projecting portion projecting to the housing space side, and in the main member portion, the projecting portion can be housed in the housing space in such a way so as to face the projecting portion to the second contact portion by elastically deforming the leg portion, and a side facing the second contact portion in the projecting portion becomes the first contact portion.

Also, in one aspect of the present invention, the main member portion includes a pair of wall portions forming a housing portion for the spring member in cooperation with the second contact portion and the pair of leg portions.

Also, in one aspect of the present invention, the male member comprises an insertion path for a string at a side of the main member portion, and forms a communication portion for introducing the spring member to the housing portion using the insertion path between the insertion path and the housing portion.

According to the present invention, this type of cord lock can be formed by three parts of the female member, the male member, and the spring member, so that the number of structural parts thereof can be appropriately minimized.

DETAILED DESCRIPTION OF THE INVENTION

Figure 1:
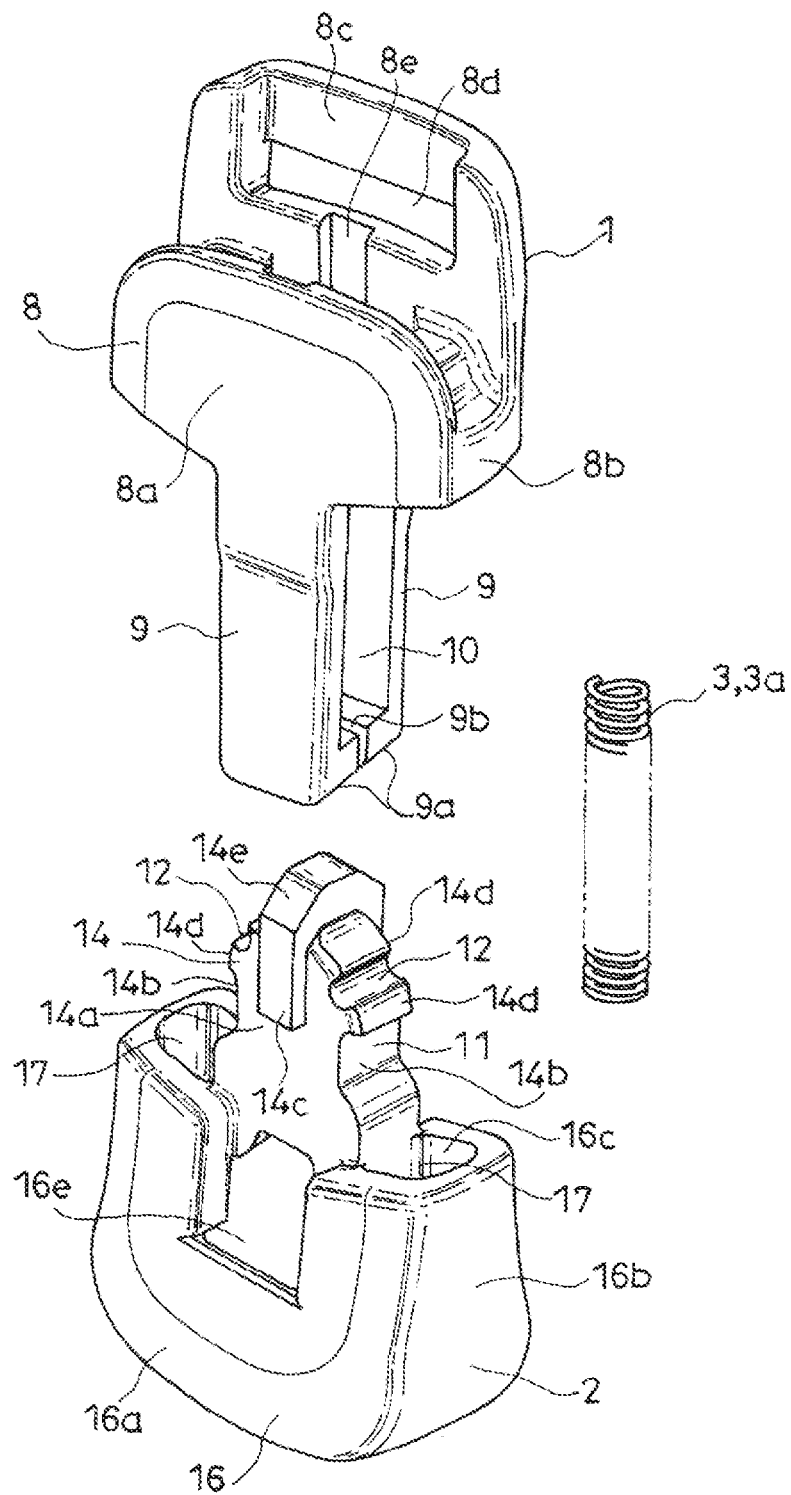
FIG. 1 is an exploded perspective view of a cord lock according to the first embodiment of the present invention.

Hereinafter, a typical embodiment of the present invention will be explained with reference to FIG. 1 to FIG. 15.

A cord lock R according to the embodiment can be fastened to an arbitrary position of a string C, and is formed such that the aforementioned fastened state is releasable by a pulling operation which reduces an entering amount of one portion of a male member 2 into a female member 1.

Such string C may have any shape (a round string, a flat string, and the like), any material, or any structure (a knitted string, an elastic string, a string made of synthetic resin, and the like) provided that the cord lock R can be fastened in the aforementioned manner. Typically, such cord lock R is fastened to the string C in various types of articles provided with a portion which is narrowed or tightened by the aforementioned string C, and is used in such a way so as to narrow or loosen the aforementioned portion by changing a fastening position thereof.

The female member 1 comprises a first opening 4, a second opening 5, and an insertion path 6 for the string C ranging therebetween.

On the other hand, the male member 2 enters one portion thereof into the insertion path 6 from the first opening 4 side, and comprises a male-side fastening portion 12 to be fastened to the string C inserted to pass through the insertion path 6 in cooperation with a female-side fastening portion 7 formed inside the insertion path 6 at the aforementioned one portion.

Also, a spring member 3 for storing energy by the pulling operation is interposed between the female member 1 and the male member 2. In an illustrated example, such spring member 3 is a compression coil spring 3a for storing energy by the pulling operation.

Fastening relative to the string C is released by the pulling operation of reducing the entering amount of one portion of the male member 2 into the insertion path 6 relative to the female member 1 by gripping the string C pulled out of the first opening 4 side, and the pulling operation of reducing the entering amount of one portion of the male member 2 into the insertion path 6 relative to the male member 2 by gripping the string C pulled out of the second opening 5 side.

In the embodiment, in the cord lock R, the string C passes through respective both sides sandwiching a moving center axis x (see FIG. 11) of the male member 2.

In a state wherein the pulling operation is not carried out, the string C can be clamped by the female-side fastening portion 7 and the male-side fastening portion 12 inside the insertion path 6 by the spring member 3, thereby the cord lock R is fastened to the arbitrary position of the string C.

Figure 15:
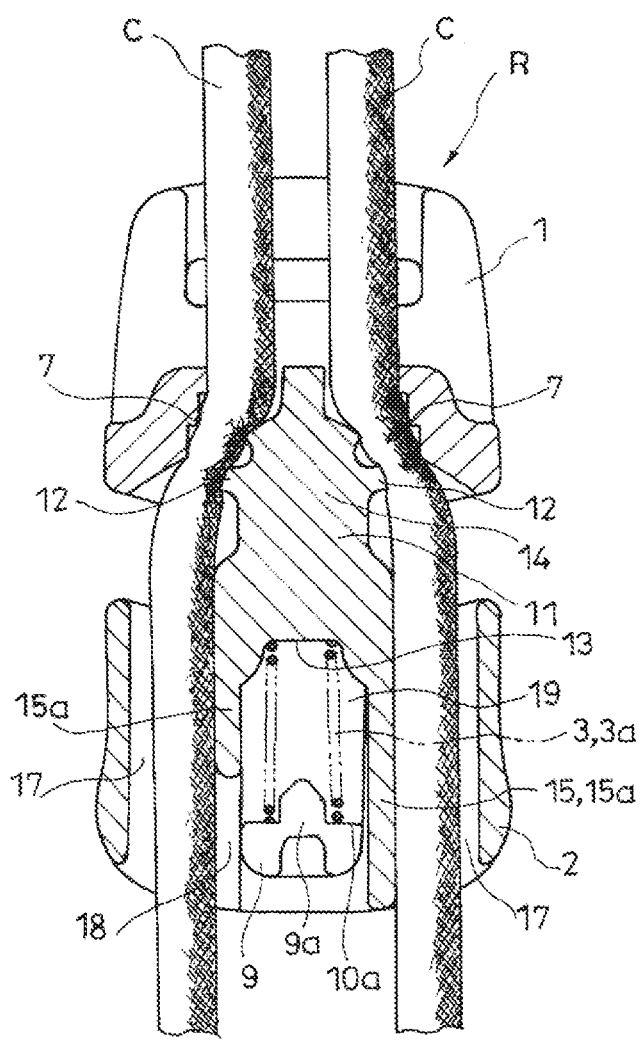
FIG. 15 is a cross-sectional view showing a state in FIG. 14 at a position of diffing by 90 degrees from FIG. 14 in cross section.

When the female member 1 is operated to be pulled to an upper side in FIG. 15 by gripping the string C pulled out of the first opening 4 side, the fastened state of the cord lock R relative to the string C is released, and the cord lock R moves to the upper side in FIG. 15 as a whole, and when the pulling operation to the upper side halts, the cord lock R fastens to the string C again at a position after the movement. Also, when the male member 2 is operated to be pulled to a lower side in FIG. 15 by gripping the string C pulled out of the second opening 5 side, the fastened state of the cord lock R relative to the string C is released, and the cord lock R moves to the lower side in FIG. 15 as a whole, and when the pulling operation to the lower side halts, the cord lock R fastens to the string C again at a position after the movement.

The female member 1 comprises a female-side main member portion 8 and a pair of leg portions 9 and 9.

The female-side main member portion 8 is formed such that a cross-sectional shape in a direction orthogonal to the moving center axis x of the male member 2 has substantially a flat cylindrical shape.

Namely, the female-side main member portion 8 comprises a pair of wide face portions 8a and 8a wherein a size in the direction orthogonal to the moving center axis x is enlarged; and a pair of thickness-side face portions 8b and 8b ranging between the pair of wide face portions 8a and 8a.

One cylinder end of the female-side main member portion 8 functions as the first opening 4, and the other cylinder end of the female-side main member portion 8 functions as the second opening 5.

Inner faces of the thickness-side face portions 8b of the female-side main member portion 8 incline in a direction of narrowing a width of an inside of the female-side main member portion 8 as advances to the second opening 5. In the illustrated example, on both sides sandwiching the moving center axis x, respectively, there are formed female-side fastening portions 7 on the inner faces of the thickness-side face portions 8b. In the illustrated example, in each female-side fastening portion 7, there are alternately formed a step face 7a substantially parallel to the moving center line x, and a step 7b substantially orthogonal to the moving center line x, in a direction of the moving center line x, so that the female-side fastening portion 7 is provided on the inner face of the thickness-side face portion 8b.

Each leg portion 9 has a band plate shape projecting from an edge portion forming the first opening 4 in the female-side main member portion 8 along the moving center axis x. One of the pair of leg portions 9 and 9 continues to one of the pair of wide face portions 8a and 8a, and extends along the moving center axis x. The other of the pair of leg portions 9 and 9 continues to the other of the pair of wide face portions 8a and 8a, and extends along the moving center axis x.

A housing space 10 for a main member portion 11 of the later-described male member 2 is made between such pair of leg portions 9 and 9.

Also, on an extending end side of the leg portion 9, there is formed a projecting portion 9a projecting to the housing space 10 side. In the illustrated example, at extending ends of the pair of leg portions 9 and 9, there are respectively formed projecting portions 9a. Between two projecting portions 9a, there is formed a gap 9b. Also, in the two projecting portions 9a, there are respectively formed projections 9c to enter into one spring end of the later-described spring member 3 on a side where the two projecting portions 9a face the first opening 4. The side where the two projecting portions 9a face the first opening 4, i.e., the side where the two projecting portions 9a face the later-described second contact portion 13 of the male member 2 functions as a first contact portion 10a for one spring end of the spring member 3.

In the illustrated example, a size in a direction along one moving center axis x of the pair of wide face portions 8a and 8a is larger than a size in a direction along the other moving center axis x of the pair of wide face portions 8a and 8a, and one of the pair of wide face portions 8a and 8a includes a projecting portion 8c from the second opening 5 for a difference between the aforementioned sizes. In the illustrated example, in the projecting portion 8c, there is formed a long hole 8d in such a way so as to match a length direction along a direction orthogonal to the moving center axis x. In the illustrated example, a band-like member (not shown in the drawings) such as a tape and the like can pass through the long hole 8d.

Also, in the illustrated example, in the pair of wide face portions 8a and 8a, respectively, there are formed guide grooves 8e continuing to the first opening 4 side from the second opening 5 along the moving center axis x, and guided portions 14c of the later-described main member portion 11 of the male member 2 are guided to the guide grooves 8e.

On the other hand, the male member 2 includes the main member portion 11 provided with the male-side fastening portion 12, and the second contact portion 13 for the other spring end of the spring member 3 on a side opposite to a side where the male-side fastening portion 12 is formed.

The main member portion 11 comprises a solid front portion which becomes the one portion to enter into the female member 1; and a back portion 15 which substantially does not enter into the female-side main member portion 8 of the female member 1.

The front portion 14 comprises width-side face portions 14a facing the inner faces of the wide face portions 8a of the female member 1; and side face portions 14b facing the inner faces of the thickness-side face portions 8b of the female member 1. In two width-side face portions 14a of the front portion 14, there are respectively formed the guided portions 14c which can be housed in the guide grooves 8e of the female member 1. In the illustrated example, the main member portion 11 of the male member 2 is housed between the pair of leg portions 9 and 9 of the female member 1 while elastically deforming the leg portions 9, so that the female member 1 and the male member 2 are combined, and in a process of the combination, the guided portions 14c can be housed in the corresponding guide grooves 8e. Thereby, in the illustrated example, the male member 2 is combined with the female member 1 in a state wherein the main member portion 11 is disposed along the moving center axis x, and a string C can pass through respectively right and left of the main member portion 11.

In two side face portions 14b of the front portion 14, respectively, there are formed claw portions 14d which become the male-side fastening portions 12. Two claw portions 14d are formed at an interval between the adjacent claw portions 14d in a direction along the moving center axis x.

A connecting end to the back portion 15 in the front portion 14 is a face orthogonal to the moving center axis x, and the aforementioned face functions as the second contact portion 13 for the other spring end of the spring member 3.

The back portion 15 is formed by a pair of wall portions 15a and 15a formed along the moving center axis x. One of the pair of wall portions 15a and 15a is formed in such a way so as to continue to one of the side face portions 14b of the front portion 14, and the other of the pair of wall portions 15a and 15a is formed in such a way so as to continue to the other of the side face portions 14b of the front portion 14. Also, the second contact portion 13 is positioned between the pair of wall portions 15a and 15a, and the compression coil spring 3a can be housed between the pair of wall portions 15a and 15a.

Namely, in the embodiment, the male member 2 comprises the main member portion 11 provided with the second contact portion on the side opposite to the side where the male-side fastening portion 12 is formed, and the female member 1 comprises the pair of leg portions 9 and 9 extending from the first opening 4, and making the housing space 10 for the main member portion 11 between the leg portions. On the extending end side of each leg portion 9, there is formed the projecting portion 9a projecting to the housing space 10 side, and the main member portion 11 can be housed in the housing space 10 such that the projecting portion 9a faces the second contact portion 13 by elastically deforming the leg portion 9. Also, the side where the projecting portion 9a faces the second contact portion 13 becomes the first contact portion 10a.

Also, in a state wherein the male member 2 and the female member 1 are combined, there is formed a housing portion 19 for the spring member 3 in cooperation with the pair of wall portions 15a and 15a of the main member portion 11, the second contact portion 13, and the pair of leg portions 9 and 9.

Specifically, the front portion 14 of the main member portion 11 which becomes the one portion of the male member 2 can be inserted into the female member 1 while elastically deforming the leg portion 9 in a direction of widening a distance between the pair of leg portions 9 and 9 of the female member 1. In the illustrated example, at the extending end of the leg portion 9 of the female member 1, there is formed a guided face 9d contacting a guide face 14e formed in the guided portion 14c in a front end of the front portion 14 of the main member portion 11 of the male member 2 to promote elastic deformation in the aforementioned direction of the leg portion 9.

When the front portion 14 of the main member portion 11 of the male member 2 is inserted to a position where the projecting portion 9a which becomes the first contact portion 10a is positioned behind the second contact portion 13 thereof, the pair of leg portions 9 and 9 elastically returns, so that the first contact portion 10a and the second contact portion 13 face each other, and the male member 2 and the female member 1 are combined in a state wherein the male member 2 and the female member 1 do not separate, and there is formed the housing portion 19.

In the embodiment, the first contact portion 10a for one spring end of the spring member 3 is integrally formed with the female member 1, and the second contact portion 13 for the other spring end of the spring member 3 is integrally formed with the male member 2. Thereby, the cord lock according to the embodiment can be appropriately formed by three parts of the male member 2, the female member 1, and the spring member 3.

Figure 2:
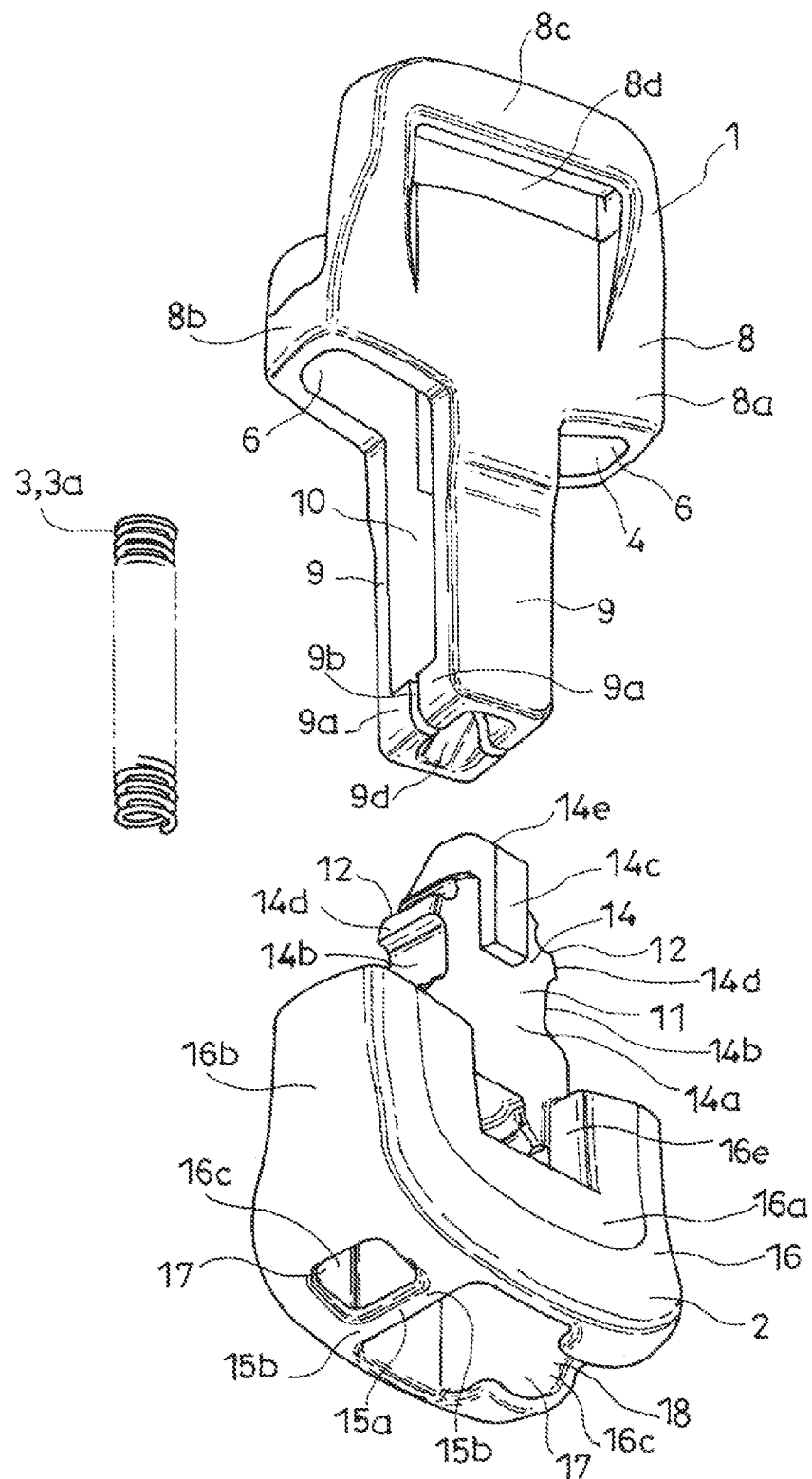
FIG. 2 is an exploded perspective view of the cord lock, and shows the cord lock viewed from a direction of differing from FIG. 1.
Figure 3:
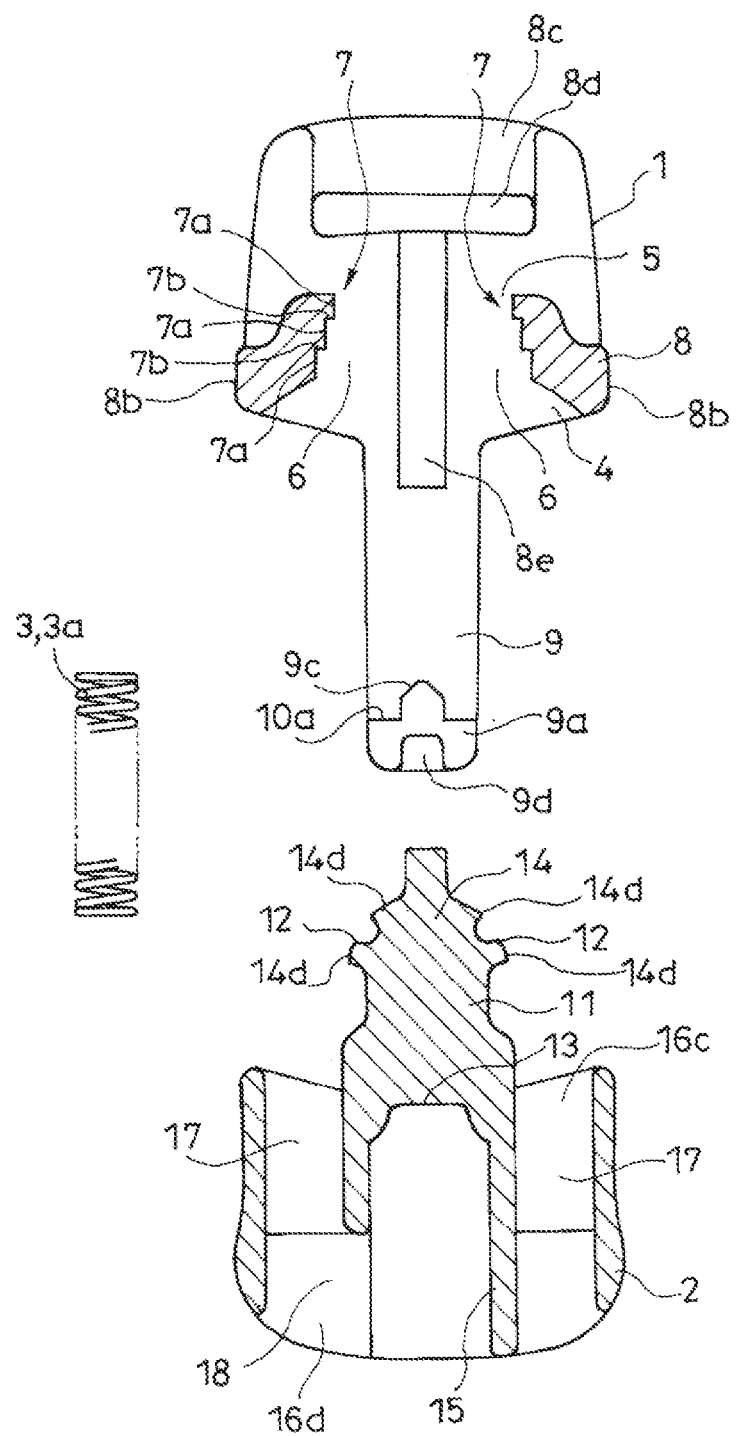
FIG. 3 is an exploded cross-sectional view of the cord lock.
Figure 4:
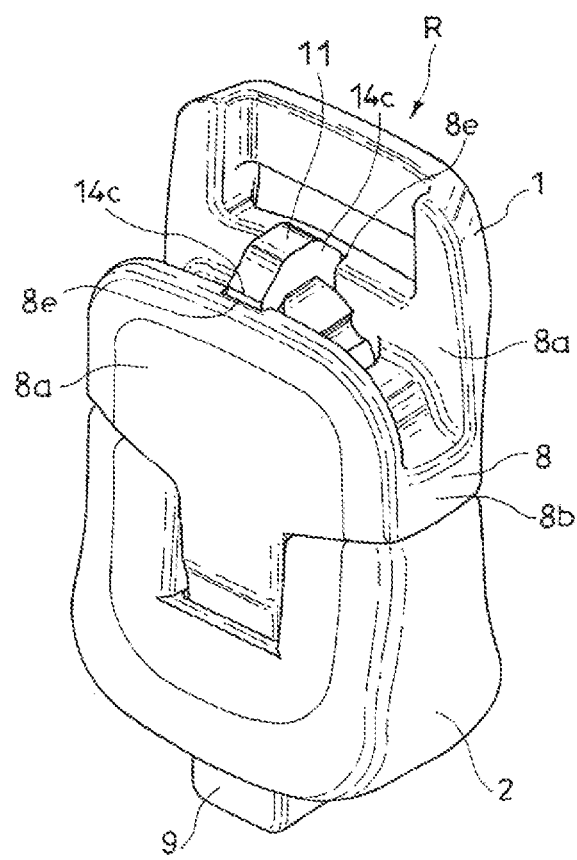
FIG. 4 is a perspective view of the cord lock.
Figure 5:
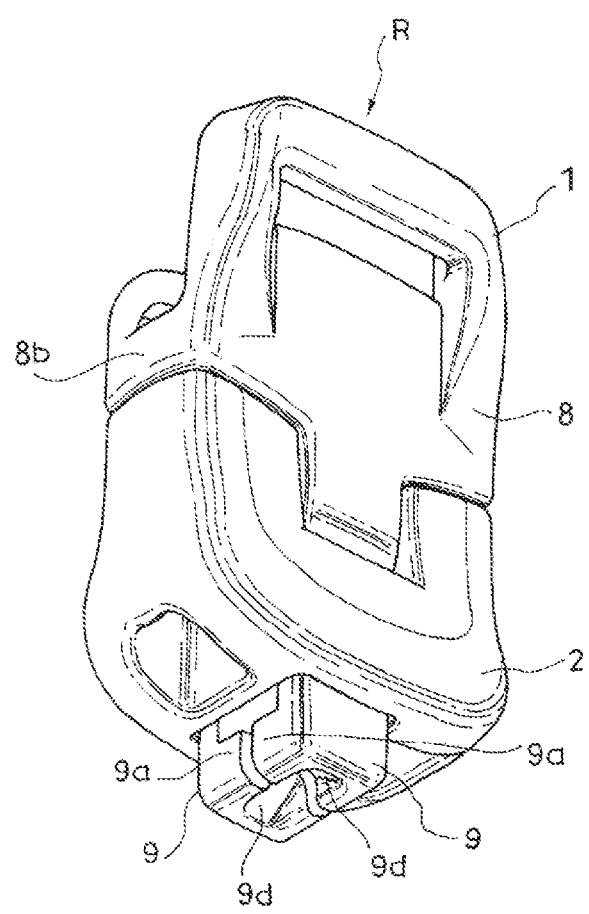
FIG. 5 is a perspective view of the cord lock, and shows the cord lock viewed from a direction of differing from FIG. 4.
Figure 6:
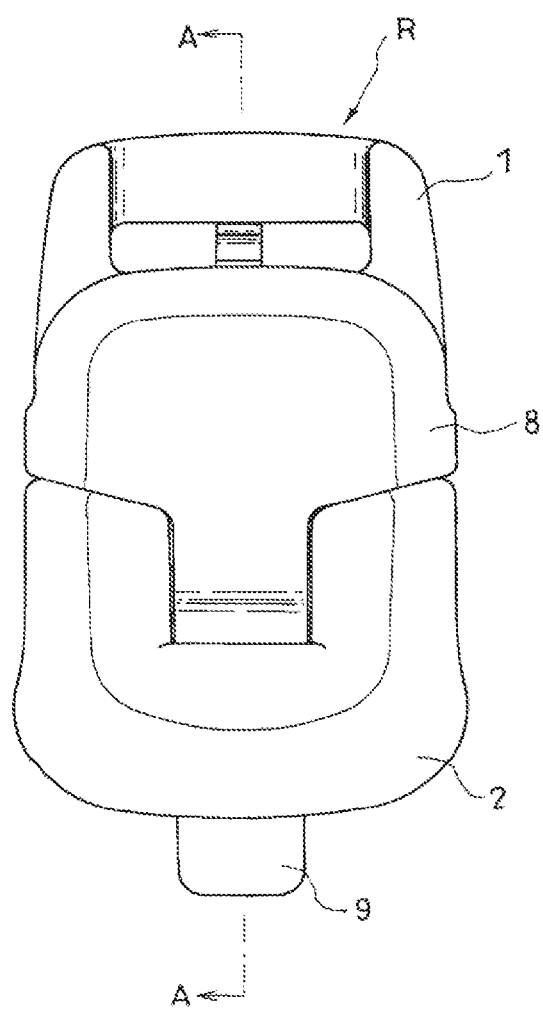
FIG. 6 is a front view of the cord lock.
Figure 7:
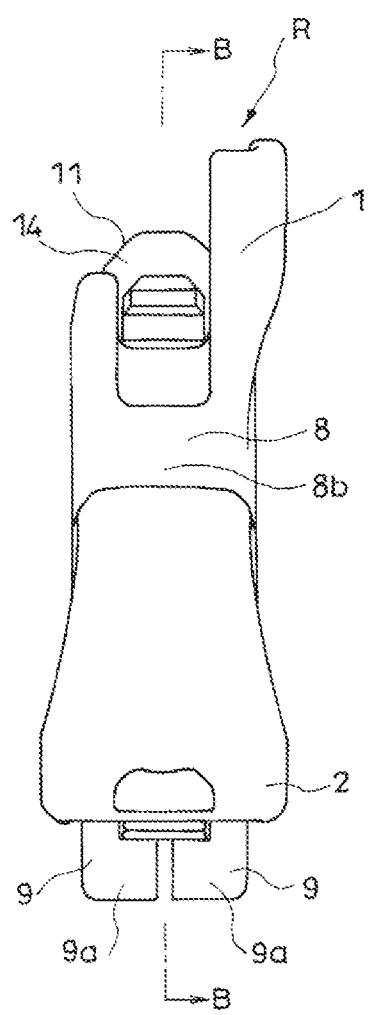
FIG. 7 is a side view of the cord lock.
Figure 8:
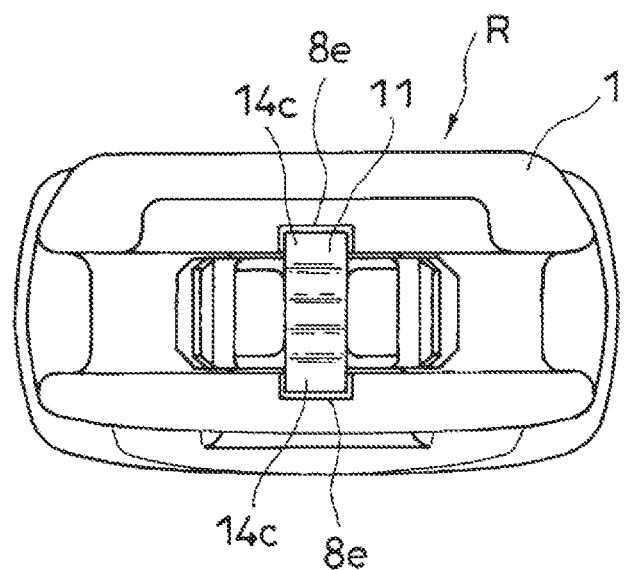
FIG. 8 is a side view wherein the cord lock is viewed from an upper side in FIG. 6.
Figure 9:
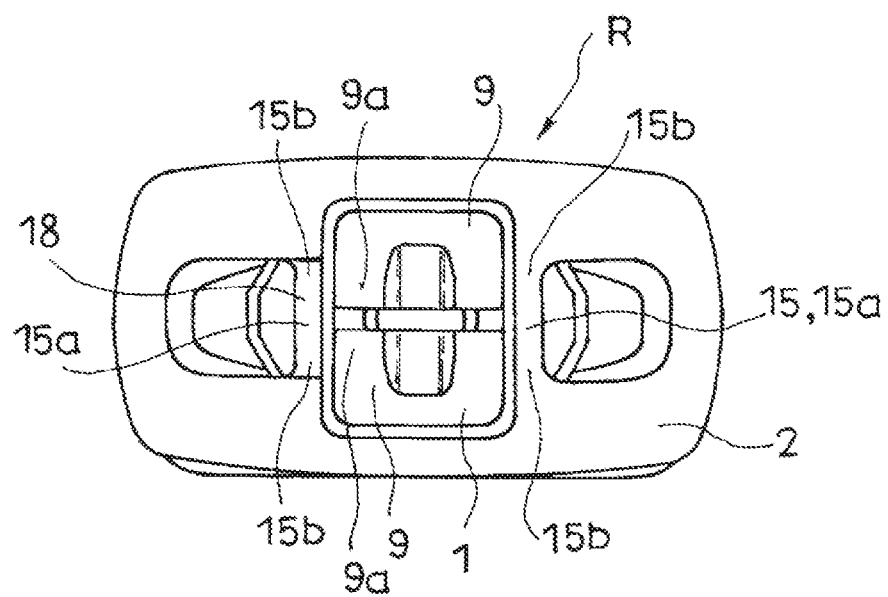
FIG. 9 is a side view wherein the cord lock is viewed from a lower side in FIG. 6.
Figure 10:
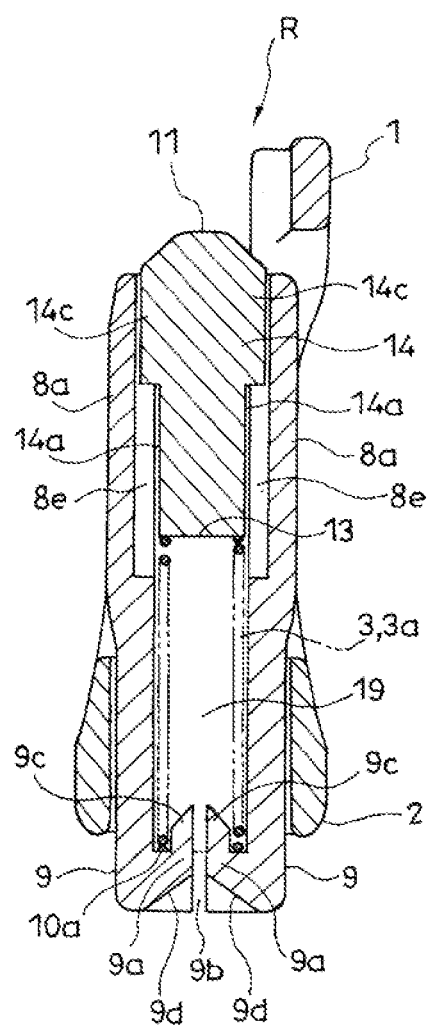
FIG. 10 is a cross-sectional view taken along an A-A line position in FIG. 6.
Figure 11:
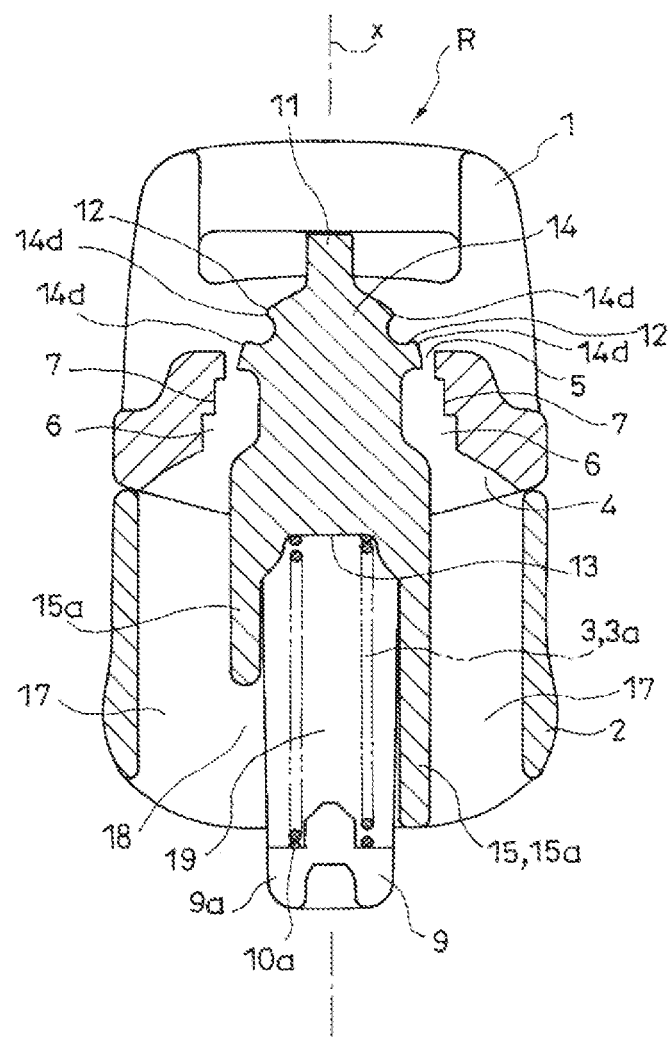
FIG. 11 is a cross-sectional view taken along a B-B line position in FIG. 7.
Figure 12:
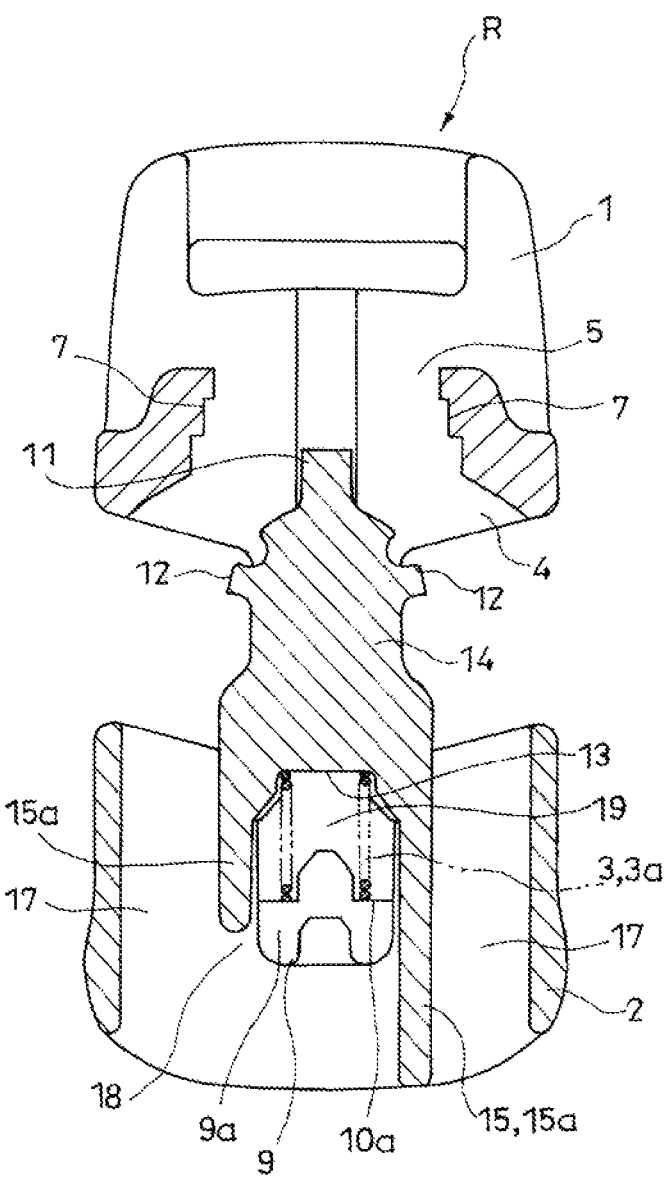
FIG. 12 is a cross-sectional view showing a state wherein a male member is operated to be maximally pulled out of an inside of a female member.
Figure 13:
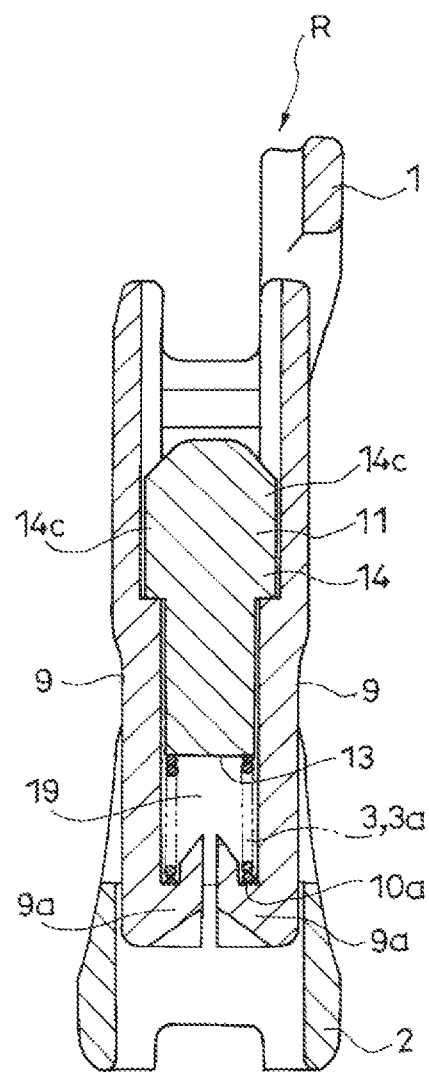
FIG. 13 is a cross-sectional view showing a state in FIG. 12 at a position of diffing by 90 degrees from FIG. 12 in cross section.
Figure 14:
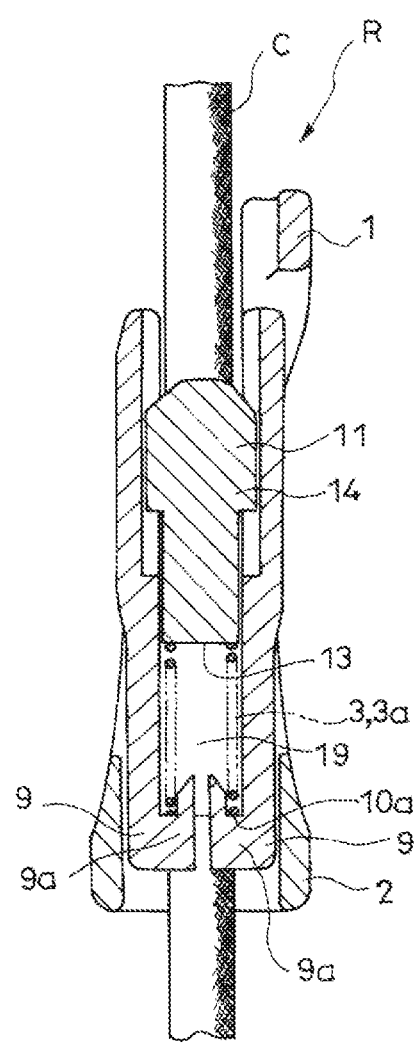
FIG. 14 is a cross-sectional view of the cord lock, and shows a state wherein the cord lock is fastened to a string.

In the illustrated example, the male member 2 includes a head portion 16 wherein a cross-sectional shape thereof in a direction orthogonal to the moving center axis x has substantially a flat cylindrical shape. Namely, the head portion 16 comprises a pair of wide face portions 16a and 16a wherein a size in a direction orthogonal to the moving center axis x is increased, and a pair of thickness-side face portions 16b and 16b ranging between the pair of wide face portions 16a and 16a. In a combined state of the male member 2 and the female member 1, the wide face portions 16a of the head portion 16 are positioned on a side same as the wide face portions 8a of the female member 1, and the thickness-side face portions 16b of the head portion 16 are positioned on a side same as the thickness-side face portions 8b of the female member 1. The head portion 16 comprises a third opening 16c facing the first opening 4 of the female member 1, and a fourth opening 16d on a side opposite to the third opening 16c. Then, the head portion 16 and the main member portion 11 are integrated in such a way so as to project the front portion 14 of the main member portion 11 from the third opening 16c of the head portion 16. Specifically, the wall portion 15a forming the back portion 15 is integrated with the wide face portion 16a of the head portion 16, and in the combined state of the male member 2 and the female member 1, the leg portion 9 of the female member 1 enters into the head portion 16 by passing between the pair of wall portions 15a and 15a. Also, on the right and left of the male member 2, respectively, there is formed an insertion path for the string C between the thickness-side face portion 16b of the head portion 16 and the wall portion 15a of the back portion 15. Specifically, in the wall portion 15a, one edge portion 15b along a continuous direction thereof is integrated with one inner face of the pair of wide face portions 16a and 16a of the head portion 16, and the other edge portion 15b along the continuous direction thereof is integrated with the other inner face of the pair of wide face portions 16a and 16a of the head portion 16, respectively (FIG. 2).

Incidentally, in the illustrated example, in the wide face portion 16a of the head portion 16, there is formed a notch portion 16e opening outwardly on the first opening 4 side between a position of an approximately middle in the direction of the moving center axis x and the first opening 4, and the notch portion 16e communicates with a space between the pair of wall portions 15a and 15a of the back portion 15 of the main member portion 11 (FIG. 1).

Also, in the present embodiment, there is formed a communication portion 18 for introducing the spring member 3 to the housing portion 19 using the insertion path 17 between the insertion path 17 and the housing portion 19.

In the illustrated example, although one of the pair of wall portions 15a and 15a has a length ranging between the third opening 16c and the fourth opening 16d of the head portion 16, the other of the pair of wall portions 15a and 15a is shorter than a length of one of the pair of wall portions 15a and 15a, and there is formed the communication portion 18 between a terminal facing a fourth opening 16d side of the other of the wall portions 15a and the fourth opening 16d.

Thereby, in the present embodiment, from the state wherein the male member 2 and the female member 1 are combined, the spring member 3 is housed in the housing portion 19 using the insertion path 17 and the communication portion 18 so as to create a state of operating an urging force in a direction of clamping the string C between the male-side fastening portion and the female-side fastening portion 7 after the male member 2 and the female member 1 are combined.

Typically, on both sides sandwiching the moving center axis x, respectively, the string C pulled out of the first opening 4 through the insertion path 6 from the second opening 5 of the female member 1 is passed through the insertion path 17 of the male member 2. From that state, the front portion 14 of the main member portion 11 of the male member 2 is led into the female-side main member portion 8 by passing between the pair of leg portions 9 and 9 of the female member 1 and through the first opening 4 so as to combine the male member 2 and the female member 1. After that, the spring member 3 is housed in the housing portion 19 using the insertions path 17 and the communication portion 18, so that in a state wherein the string C is passed through respectively the right and left of the moving center axis x, the male member 2 and the female member 1 can be integrated, and the spring member 3 can be incorporated in such a way so as to store energy by the pulling operation. In a state wherein the pulling operation is not carried out, the entering amount of the front portion 14 of the main member portion 11 as one portion of the male member 2 into the female-side main member portion 8 as the insertion path 6 of the female member 1 is maximized, and the string C passing through in the aforementioned manner is clamped between the male-side fastening portion 12 and the female-side fastening portion 7, so that the cord lock is fastened to an arbitrary position of the string C.

When the aforementioned pulling operation is carried out, while compressing the compression coil spring 3a as the spring member 3 and storing energy, the entering amount of the front portion 14 of the main member portion 11 as one portion of the male member 2 into the female-side main member portion 8 of the female member 1 as the insertion path 6 is reduced, and a distance between the male-side fastening portion 12 and the female-side fastening portion 7 widens so as to loosen the tightening of the string C between the male-side fastening portion 12 and the female-side fastening portion 7, and to release the fastening of the cord lock R relative to the string C.

The male member 2 and the female member 1 are typically formed by plastic. In such a case, an elastic deformation characteristic as described above can be easily and appropriately provided to the pair of leg portions 9 and 9 of the female member 1.

Incidentally, naturally, the present invention is not limited to the embodiment explained hereinabove, and includes all embodiments which can obtain the object of the present invention.

The disclosure of Japanese Patent Application No. 2017-173696, filed on Sep. 11, 2017, is incorporated in the application.

While the invention has been explained with reference to the specific embodiments of the invention, the explanation is illustrative and the invention is limited only by the appended claims.

What is claimed is:

1. A cord lock, comprising:
   a female member having a first opening, a second opening, an insertion path for a string therebetween, and female-side fastening portions formed in the insertion path;
   a male member having one portion entering into the insertion path from a side of the first opening, and male-side fastening portions at the one portion adapted to be fastened to the string inserted to pass through the insertion path in cooperation with the female-side fastening portions; and
   a spring member interposed between the female member and the male member,
   wherein fastening relative to the string is released by a pulling operation of reducing an entering amount of the one portion of the male member into the insertion path, the spring member storing energy by the pulling operation,
   a first contact portion of one spring end of the spring member is integrally formed with the female member, and a second contact portion of another spring end of the spring member is integrally formed with the male member,
   the male member includes a main member portion having the second contact portion on a side opposite to a side where the male-side fastening portions are formed,
   the female member includes a pair of leg portions extending from the first opening to form a housing space for the main member portion between the leg portions, and projecting portions each projecting to the housing space at an extending end of each leg portion,
   the main member portion is housed in the housing space in such a way to face the projecting portions to the second contact portion by elastically deforming the pair of leg portions, and
   a side facing the second contact portion in the projecting portion becomes the first contact portion.

2. A cord lock according to claim 1, wherein the main member portion includes a pair of wall portions forming a housing portion for the spring member in cooperation with the second contact portion and the pair of leg portions.

3. A cord lock according to claim 2, wherein the male member includes insertion paths for strings at sides of the main member portion, and forms a communication portion between the insertion path and the housing portion, for introducing the spring member to the housing portion using the insertion paths.

\* \* \* \* \*